(12) United States Patent
Royt et al.

(10) Patent No.: US 9,669,753 B1
(45) Date of Patent: Jun. 6, 2017

(54) CARGO TIEDOWN TENSIONER

(71) Applicant: Peck & Hale, L.L.C., West Sayville, NY (US)

(72) Inventors: Joseph Royt, Fresh Meadows, NY (US); Richard Belkin, Bay Shore, NY (US)

(73) Assignee: Peck & Hale, L.L.C., West Sayville, NY (US)

( * ) Notice: Subject to any disclaimer, the term of this patent is extended or adjusted under 35 U.S.C. 154(b) by 0 days.

(21) Appl. No.: 15/170,379

(22) Filed: Jun. 1, 2016

Related U.S. Application Data (60) Provisional application No. 62/169,179, filed on Jun. 1, 2015.

(51) Int. Cl.
*B66C 1/34* (2006.01)
*B60P 7/08* (2006.01)

(52) U.S. Cl.
CPC ........... *B60P 7/0853* (2013.01); *B60P 7/0838* (2013.01)

(58) Field of Classification Search
CPC ... B65G 7/12; B66C 1/34; E21B 19/04; B25J 1/04; B60P 3/075; B60P 3/073; B60P 7/0823; B60P 7/083; B60P 7/0807; B60P 7/0853; B60P 7/0838; F16G 11/12; A44B 11/006; E04B 1/34347
See application file for complete search history.

(56) References Cited

U.S. PATENT DOCUMENTS

| | | | | |
|---|---|---|---|---|
| 1,733,508 A | * | 10/1929 | Minor | E21B 19/04 248/339 |
| 1,806,908 A | * | 5/1931 | Long | E21B 19/04 294/82.1 |
| 1,922,386 A | * | 8/1933 | Minor | E21B 19/04 294/82.1 |
| 2,508,595 A | * | 5/1950 | Christensen | E21B 19/02 254/401 |
| 2,848,777 A | | 8/1958 | Huber | |
| 2,903,767 A | | 9/1959 | Huber | |
| 3,848,689 A | * | 11/1974 | Hilterhaus | G01G 19/60 177/148 |
| 4,039,219 A | * | 8/1977 | Bugman | B66C 1/36 24/599.6 |
| 4,135,834 A | | 1/1979 | Bartman | |
| 4,850,768 A | | 7/1989 | Huber | |
| 6,530,127 B2 | | 3/2003 | Curtin, Sr. et al. | |
| 8,220,244 B2 | | 7/2012 | Smetz | |
| 8,602,468 B2 | | 12/2013 | Kutsen | |
| 8,646,820 B2 | | 2/2014 | Knox | |
| 8,702,360 B1 | | 4/2014 | Smith | |

* cited by examiner

*Primary Examiner* — Stephen Vu
(74) *Attorney, Agent, or Firm* — Schroeder Law PC (57) ABSTRACT

A tiedown tensioner having a rotatably adjustable hook which can be operated in confined areas using a single hand. The tiedown tensioner facilitates the preferred positioning of the tensioning chain within the blind pocket, minimizes the potential energy for any given load, and dissipates the kinetic energy in a manner which minimizes the kickback movement of the tensioner.

13 Claims, 7 Drawing Sheets

Perspective Detail of Internal Components

Figure 1a - Perspective View of Tie Down Tensioner

Figure 1b - Perspective View of Tie Down Tensioner

Figure 3 - Perspective Detail of Internal Components

Views Showing Hook Indexing

Sliding Block, Hook & Index Lever

Figure 5 - Cutaway Section View After Release

Detail B

Figure 6 - Cutaway Detail of Chain Attachment

Figure 7 - Cutaway Detail of Tie Down Tensioner
At the Moment of Tension Release

Figure 7a - Detail A

Figure 8 - Cutaway View of Tie Down Tensioner in Locked Position

F$_L$ - Load
F$_N$ - Normal Force
F$_R$ - Release Force
F$_{FR}$ - Friction Force
Q$_R$ - Resultant Force (Normal to Slot)
Q$_S$ - Sliding Force Figure 8a - Detail F
Cutaway View of Tie Down Tensioner in Locked Position

CARGO TIEDOWN TENSIONER

This application claims the benefit of U.S. Provisional Application Ser. No. 62/169,179 filed Jun. 1, 2015, the disclosure of which is hereby incorporated by reference in its entirety.

BACKGROUND OF THE INVENTION

The present invention relates to cargo tiedown tensioners used to secure cargo during transportation and, more particularly, to tensioners including both a hook for attachment to a fixed point and a pivotably-mounted chain block for releasably engaging a tensioning chain.

Cargo tiedown tensioners are used to secure cargo in aircraft, trains, trucks, ships, and the like, where it is necessary to prevent a shifting of such cargo during acceleration and/or movement of the transportation vehicle. In many applications, there is limited space for the operator to maneuver the tensioner, thereby hindering installation/removal of such device. To increase the ease of installation/removal of the tensioner, certain tiedown tensioners, such as the device disclosed in U.S. Pat. No. 8,646,820, now include a hook wherein the orientation of the hook can be adjusted by the operator. As will be recognized by those skilled in the art, the ability to orient the hook allows the operator to position the release handle of the tensioner in the most appropriate orientation for that particular installation. However, the prior art tiedown tensioners which include a rotatably adjustable hook suffer from the disadvantage that the operator is often required to use both hands to adjust the orientation of the hook. For example, the device disclosed in U.S. Pat. No. 8,646,820 requires the operator to simultaneously apply an axial tension force on opposing sides of the device to overcome a locking spring force before the hook can be reoriented. As already mentioned, the installation space in which the tensioner is installed is often quite limited, thereby rendering a device which may require two hands to re-orient the hook less than desirable.

The prior art discloses various chain tensioning and tiedown devices including the devices shown in U.S. Pat. Nos. 2,848,777, 2,903,767 and 4,850,768. These devices include a pivotably-mounted chain block having an entrance path to receive a tensioned segment of chain, and a blind pocket from which the slack (or free end) of the chain extends. There are, however, a number of problems associated with conventional tiedown devices, including those disclosed in the foregoing patents. In such devices, the precise placement of the chain in the blind pocket is important. If the chain link is not installed properly in the blind pocket (in contact with the bottom of the blind pocket), the force for release is increased in direct proportion to the increase in distance between the contact point and the bottom of the blind pocket. Accordingly, the operator must ensure the proper position of the chain link within the tensioner during securement of the cargo.

Certain applications require tiedown tensioners which are capable of being manually released under loads up to ten thousand (10,000) pounds. Potential energy at the pivot block increases as a function of the load. At the moment of release, potential energy in the tensioned chain is transformed into kinetic energy and transferred to the chain block. This kinetic energy results in the nearly instantaneous rotation of the chain block, such rotation typically being stopped by contact between the chain block and the rigid elements of the tensioner. Because of the nearly instantaneous transfer of the kinetic energy, the operator will likely still have his hand on the release lever, and may therefore be subjected to any kickback movement of the tensioner.

There is therefore a need in the art for a tiedown tensioner having a rotatably adjustable hook which can be operated in confined areas using a single hand. There is a further need in the art for a tiedown tensioner which facilitates the preferred positioning of the tensioning chain within the blind pocket, which minimizes the potential energy for any given load, and which dissipates the kinetic energy in a manner which minimizes the kickback movement of the tensioner.

SUMMARY OF THE INVENTION

The present invention, which addresses the needs of the prior art, provides a cargo tiedown tensioner for extending between a fixed point on a transportation vehicle and a tensioning chain. The tiedown tensioner includes: a) a rotatable hook subassembly for connecting the tiedown tensioner to the fixed point, the rotatable hook subassembly including a shaft having first and second ends, the hook subassembly further including a hook located at the first end of the threaded shaft; b) a support subassembly for transferring tension between the hook subassembly and the tensioning chain, the support subassembly including a rigid substantially closed body, the body including a slot extending along at least a portion of the length thereof; c) a tensioning subassembly cooperating with the rotatable hook assembly for taking up slack in the tensioning chain; d) an indexing mechanism for orienting the hook between predetermined positions, the indexing mechanism including a sliding block positioned inside of the body and configured to slide along at least a portion of the length thereof, the second end of the shaft being supported by the sliding block, the indexing mechanism further including a pivot lever movable between a first position wherein the shaft is rotatably fixed with respect to the sliding block and a second position wherein the shaft is rotatable with respect to the sliding block, at least a portion of the pivot lever being accessible via the slot to move the pivot lever between the first and second positions; e) a chain attachment subassembly connected to and supported by the body for securing the tensioning chain to the tiedown tensioner; and f) a release subassembly connected to the body and cooperating with the chain attachment subassembly, the release subassembly including a release lever movable between a locked position wherein the tensioning chain is retained within the chain attachment subassembly and an unlocked position wherein the tensioning chain is released from the chain attachment subassembly.

The present invention further provides a cargo tiedown tensioner for extending between a fixed point on a transportation vehicle and a tensioning chain. The tiedown tensioner includes: a) a rotatable hook subassembly for connecting the tiedown tensioner to the fixed point; b) a support subassembly for transferring tension between the hook subassembly and the tensioning chain; c) a tensioning subassembly cooperating with the rotatable hook assembly for taking up slack in the tensioning chain; d) a chain attachment subassembly connected to and supported by the body for securing the tensioning chain to the tiedown tensioner, the chain attachment subassembly including a pivot block for receiving the tensioning chain; e) a release subassembly connected to the body and cooperating with the chain attachment subassembly, the release subassembly including a release lever movable between a locked position wherein the tensioning chain is retained within the chain attachment subassembly and an unlocked position wherein the tensioning chain is released from the chain attachment subassembly; and f) a dynamic brake mechanism for dissipating the kinetic energy experienced by the tiedown tensioner at the moment of release, the dynamic brake mechanism including a pair of opposing preconfigured surfaces located on the pivot block and the body which engage upon release of the tiedown tensioner to provide a frictional braking surface.

The present invention further provides a cargo tiedown tensioner for extending between a fixed point on a transportation vehicle and a tensioning chain. The tiedown tensioner includes: a) a rotatable hook subassembly for connecting the tiedown tensioner to the fixed point; b) a support subassembly for transferring tension between the hook subassembly and the tensioning chain; c) a tensioning subassembly cooperating with the rotatable hook assembly for taking up slack in the tensioning chain; d) a chain attachment subassembly connected to and supported by the body for securing the tensioning chain to the tiedown tensioner, the chain attachment subassembly including a pivot block for receiving the tensioning chain, the pivot block rotatable about an axis O extending through the body, the pivot block including a blind pocket oriented parallel to the axis O and a sleeve oriented perpendicular to the axis O, the blind pocket defining a contact point B at the bottom thereof, the contact point B defining the point of contact between the tensioning chain and the pivot block and further defining a distance h with respect to the axis O, and wherein the axis of symmetry of the blind pocket extends through the axis O such that the tangent of an angle $\beta$ defined between a perpendicular to a load force $F_L$ and the axis of symmetry of the blind pocket is greater than the coefficient of friction between the pivot block and the tensioning chain whereby the tensioning chain is oriented to the contact point B and the distance h is minimized; and e) a release subassembly connected to the body and cooperating with the chain attachment subassembly, the release subassembly including a release lever movable between a locked position wherein the tensioning chain is retained within the chain attachment subassembly and an unlocked position wherein the tensioning chain is released from the chain attachment subassembly.

As a result, the present invention provides a tiedown tensioner having a rotatably adjustable hook which can be operated in confined areas using a single hand. The present invention further provides a tiedown tensioner which facilitates the preferred positioning of the tensioning chain within the blind pocket, minimizes the potential energy for any given load, and dissipates the kinetic energy in a manner which minimizes the kickback movement of the tensioner.

DETAILED DESCRIPTION OF THE INVENTION

Figure 1A:
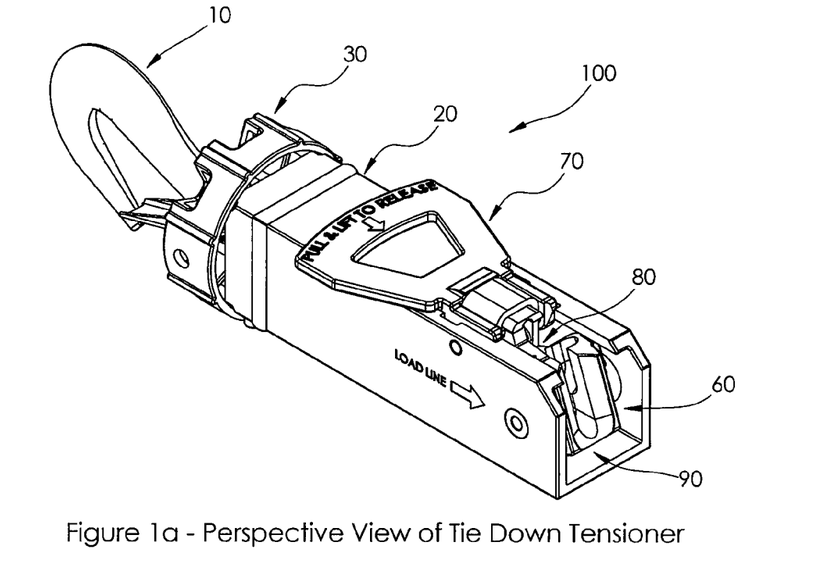
FIG. 1a is a top perspective view of the tiedown tensioner of the present invention.
Figure 1B:
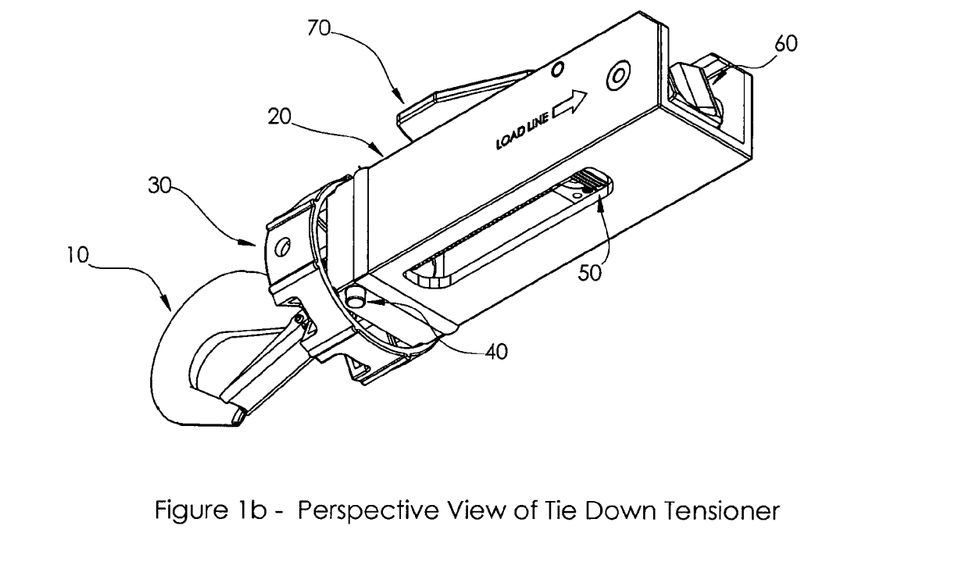
FIG. 1b is a bottom perspective view of the present tiedown tensioner.

Referring to FIGS. 1a and 1b, tiedown tensioner 100 of the present invention includes a rotatable hook subassembly 10 for connecting tiedown tensioner 100 to a fixed point on a transportation vehicle, a support subassembly 20 for transferring the tension between the hook subassembly 10 and a tensioning chain (not shown), a tensioning subassembly 30 for taking up slack in the tensioning chain, a positive locking mechanism 40 for securing tensioning subassembly 30 against inadvertent release and for allowing controlled operator increase/decrease of tension in the tensioning chain, an indexing mechanism 50 for orienting the hook between predetermined positions, a chain attachment subassembly 60 for engagement with the tensioning chain, a release subassembly 70 to allow the tensioning chain to be manually released and automatically separated from tensioner 100 in a one-handed operation, a positive chain lock mechanism 80 to prevent inadvertent detachment of the tensioning chain from tensioner 100, and a dynamic brake mechanism 90 for dissipating the kinetic energy experienced by tensioner 100 at the moment of release.

Figures 2, 2A, 2B:
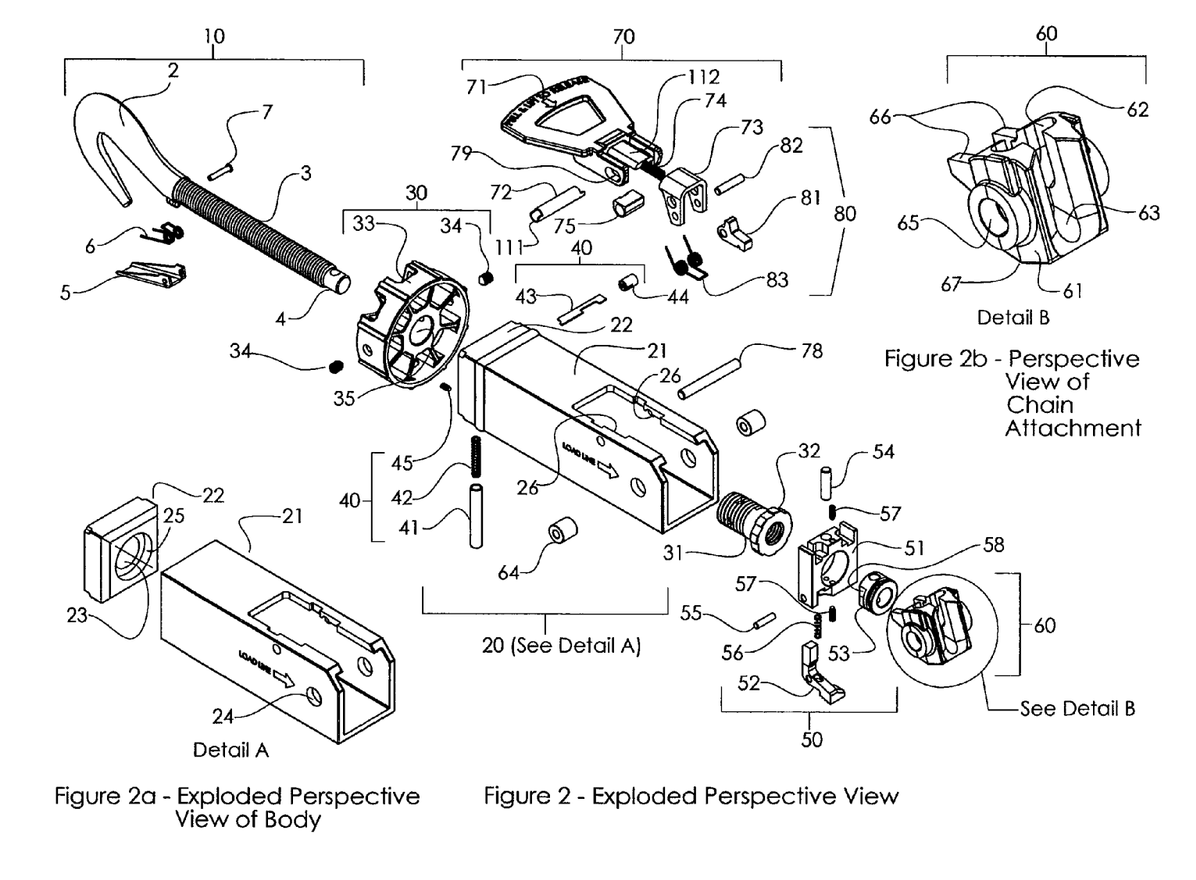
FIG. 2 is an exploded perspective view of the present tiedown tensioner.
FIG. 2a is an exploded perspective view of the body of the present tiedown tensioner.
FIG. 2b is an enlarged detail taken from FIG. 2.

Referring to FIG. 2, hook subassembly 10 includes a hook 2 having a threaded shaft 3 with a cylindrical end 4, a latch 5, a torsion spring 6 and a rivet 7. As will be explained further herein, threaded shaft 3 allows for displacement of hook 2 to remove slack in the tensioning chain or to release tension in the chain without release/separation of such chain.

Referring to FIG. 2a, support subassembly 20 includes a body 21 and an end plug 22. End plug 22 includes a central aperture 23 extending therethrough and a recessed circular step 25 surrounding aperture 23. Body 21 includes two opposing in-line apertures 24 perpendicular to aperture 23, and which are located in the same plane with the axis defining aperture 23. Body 21 is preferably a rigid substantially-closed body. In one preferred embodiment, body 21 is formed with a rectangular cross-section. The substantially-closed body design also allows for the attachment of end plug 22 to body 21 via welding or other suitable attachment methods such as swaging, soldering or press-fitting. Inasmuch as end plug 22 is formed with recessed circular step 25, the manufacturing process is facilitated by forming end plug 22 as a separate component—and thereafter attaching the end plug to body 21. The substantially-closed design of body 21 allows for the ready and satisfactory assembly of the various components of the present tensioner, while at the same time providing increased rigidity and strength (particularly against twisting loads) without significant increase in weight. Body 21 and end plug 22 are preferably formed from aluminum, titanium or other such lightweight materials, and are preferably manufactured via casting, forging, and/or machining processes.

Figure 3:
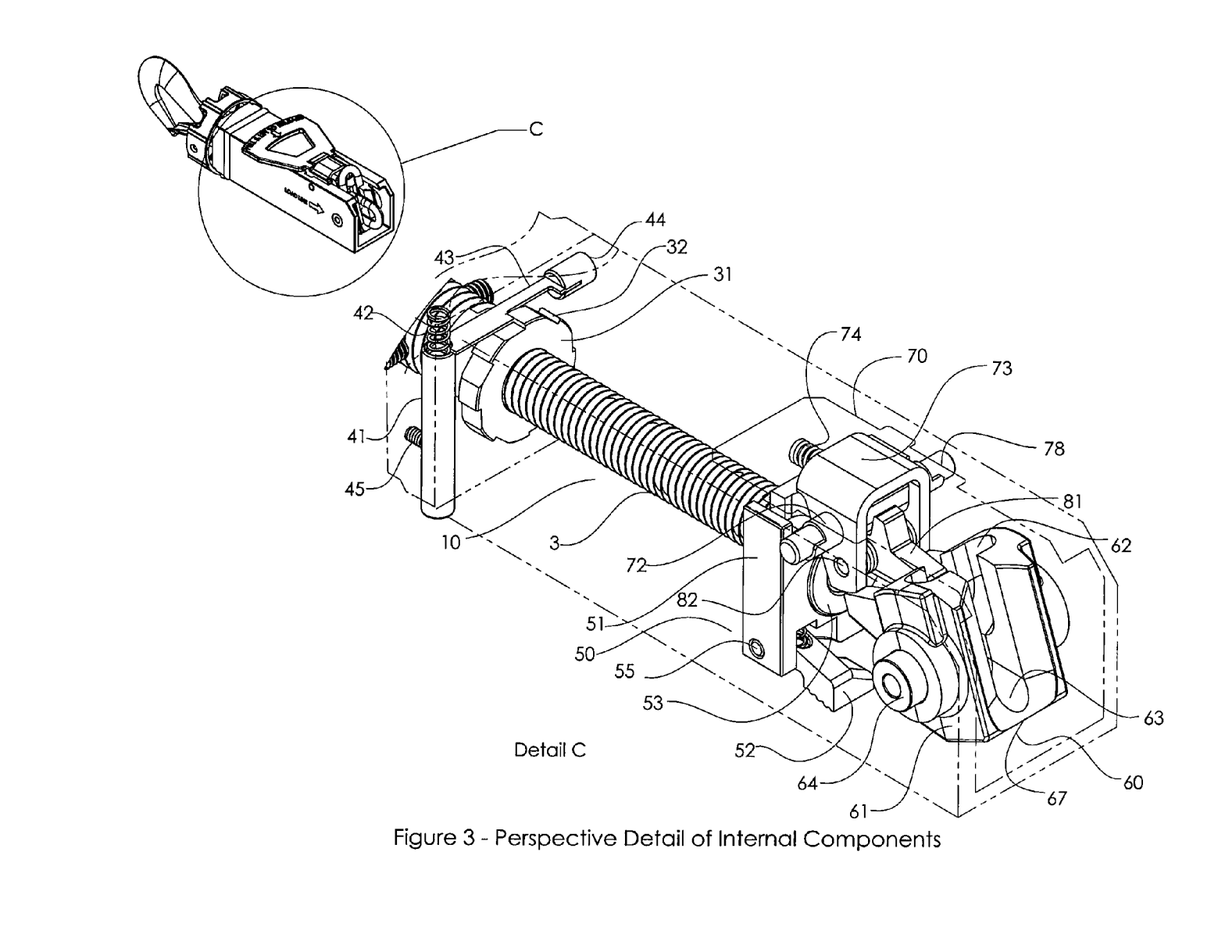
FIG. 3 is an enlarged perspective view of the present tiedown tensioner with the body removed for clarity.

Referring to FIGS. 2 and 3, tensioning subassembly 30 includes an internal nut 31 with concentric internal and external threads, a ratchet flange 32, an adjustment nut 33 with a threaded aperture 35 sized to match the external threads of internal nut 31, and two set screws 34 for securing adjustment nut 33 to internal nut 31. Rotation of adjustment nut 33 in a first direction will remove the slack in the chain (thus increasing tension), while rotating adjustment nut 33 in the opposite direction will reduce tension in the chain. More particularly, rotation of adjustment nut 33 results in the displacement of hook 2 with respect to body 21. Inasmuch as the tensioning chain (not shown) is fixed with respect to body 21, the displacement of hook 2 either removes or increases the slack in the tensioning chain.

Referring to FIGS. 2 and 3, positive locking mechanism 40 automatically engages ratchet flange 32 upon completion of the tensioning operation. Positive locking mechanism 40 includes a push button rod 41 retained by a set screw 45, a compression spring 42, a leaf spring 43 and a plug 44 to support one end of the leaf spring. Leaf spring 43 is configured and biased to engage ratchet flange 32 of internal nut 31, thereby locking hook 2 at a selected translated position. The operator can override the positive locking feature of leaf spring 43 by actuating push button rod 41—which moves leaf spring 43 out of contact with ratchet flange 32—thereby allowing the hook to be displaced with respect to body 21—whereby the tension in the chain can be released without releasing/separating of the chain from the tensioner.

Figure 4A:
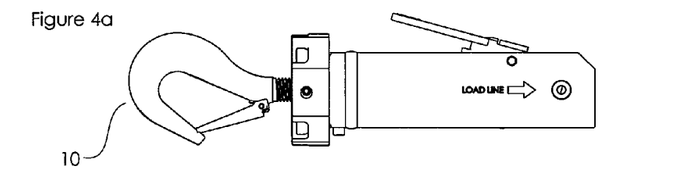
FIG. 4a is a view of the present tiedown tensioner showing the hook in a first orientation.
Figure 4B:
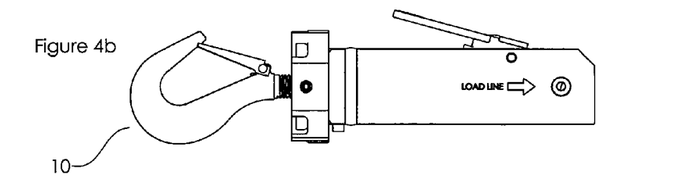
FIG. 4b is a view of the present tiedown tensioner showing the hook in a second orientation.
Figure 4C:
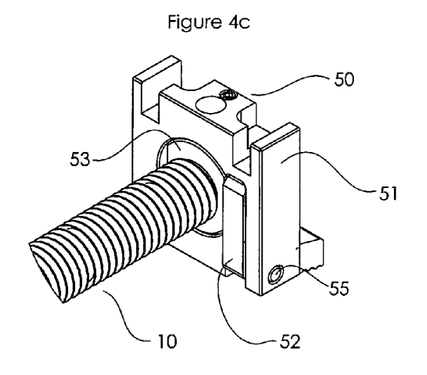
FIG. 4c is an enlarged detail showing the indexing mechanism in the locked position.
Figure 4D:
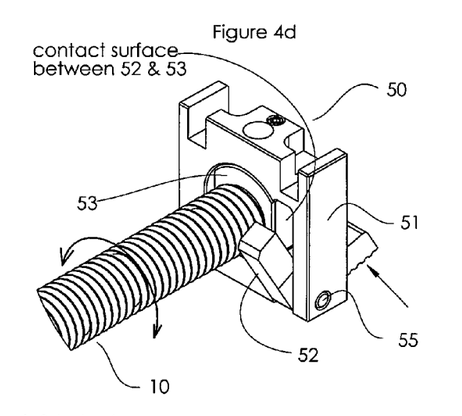
FIG. 4d is an enlarged detail showing the pivot lever of the indexing mechanism in the actuated position.
Figure 5:
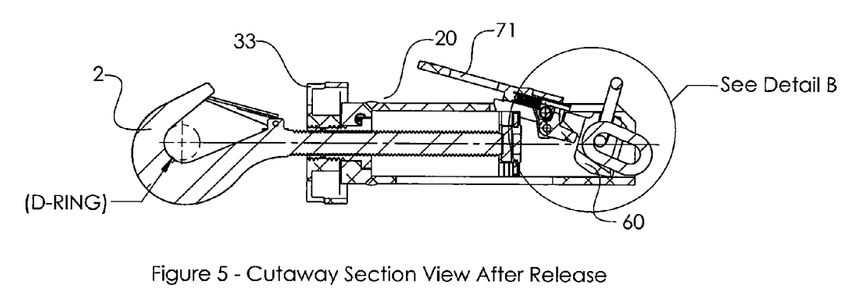
FIG. 5 is a sectional view of the present tensioner after release of the chain.
Figure 6:
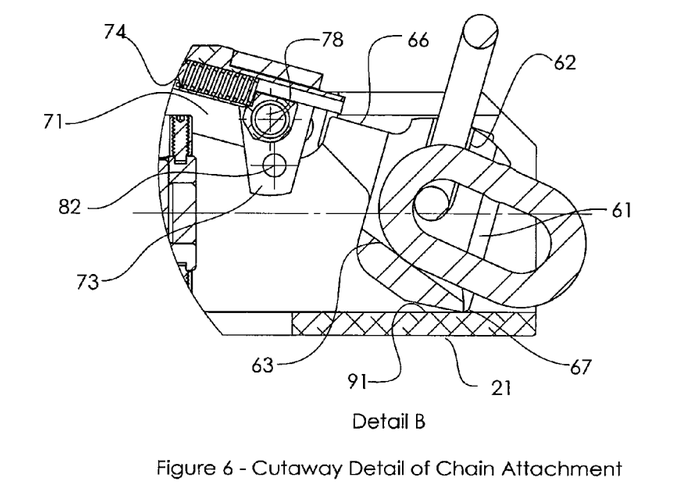
FIG. 6 is a detail taken from FIG. 5.

Referring to FIGS. 2 to 4d, indexing mechanism 50 allows for the one-handed rotation of hook 2 between at least two positions (preferably 180° apart) and includes a sliding block 51 positioned inside of body 21 of support subassembly 20, a pivot lever 52 to lock the indexed position, a sleeve bearing 53, a dowel pin 54 for connecting end 4 of hook 2 to sleeve bearing 53, a dowel pin 55 and a compression spring 56 for biasing the shoulder of pivot lever 52 to the closed vertical position. More particularly, sleeve bearing 53 is formed with at least two opposing contact surfaces 58. Contact surfaces 58 engage pivot lever 52, thereby preventing rotation of bearing 53 within sliding block 51. When pivot lever 52 is actuated (as shown in FIG. 4d), bearing 53 is free to rotate within sliding block 51. Stated differently, hook 2 can be rotated upon actuation of pivot lever 52. Once hook 2 is reoriented, pivot lever 52 is released and returns to the locked position via compression spring 56, thereby locking hook 2 in its reoriented position. This can be accomplished by a single hand of the operator.

Referring to FIGS. 2b and 3, chain attachment subassembly 60 allows tensioner 100 to be quickly attached to a link of a tensioning chain, while also allowing automatic release of the tensioning chain upon operation of release assembly 70. Chain attachment subassembly 60 includes a chain attachment pivot block 61 having a chain link blind pocket 62, a slot 63 for the next chain link, and two bushings 64 which are press-fit into apertures 65 of pivot block 61. Pivot block 61 includes two shoulders 66 oriented perpendicular to pocket 62 and parallel to apertures 24 (see FIG. 2a). A curved cam surface 67 is oriented eccentrically to the bottom surface of body 21.

Referring to FIGS. 2 and 3, release subassembly 70 includes a release lever 71 and a support tube 72 extending through an elongated slot 79 of release lever 71 thereby allowing for both rotation and translation of release lever 71 with respect to body 21. As shown, support tube 72 preferably includes a pair of notches 111 formed on opposing ends thereof. Support tube 72 preferably extends between the internal vertical walls of body 21, with notches 111 contacting lips 26 of body 21 to prevent rotation of support tube 72 with respect to body 21. Release subassembly 70 further includes a release lock 73 pivotably mounted on support tube 72 and a spring block 75 positioned between the legs of release lock 73. Spring block 75 slidingly contacts tongue 112 of release lever 71, thereby preventing rotation of slide block 75 with respect to release lever 71. Release subassembly 70 further includes a compression spring 74 positioned between release lever 71 and spring block 75 for biasing release lever 71 to the locked position. Finally, release subassembly 70 includes a dowel pin 78 installed through opposing apertures 27 of body 21 for pivotably securing lever 71 and release lock 73 to body 21. As best seen in FIG. 3, the legs of release lock 73 contact and engage shoulders 66 of pivot block 61 when the tensioner is in the locked position—thus securing pivot block 61 against rotation. During operation, the tensioning chain would remain engaged to pivot block 61 while in this orientation.

Figure 8:
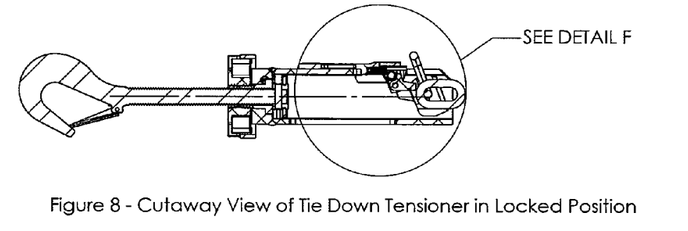
FIG. 8 is a sectional view of the present tensioner in the locked position.
Figure 8A:
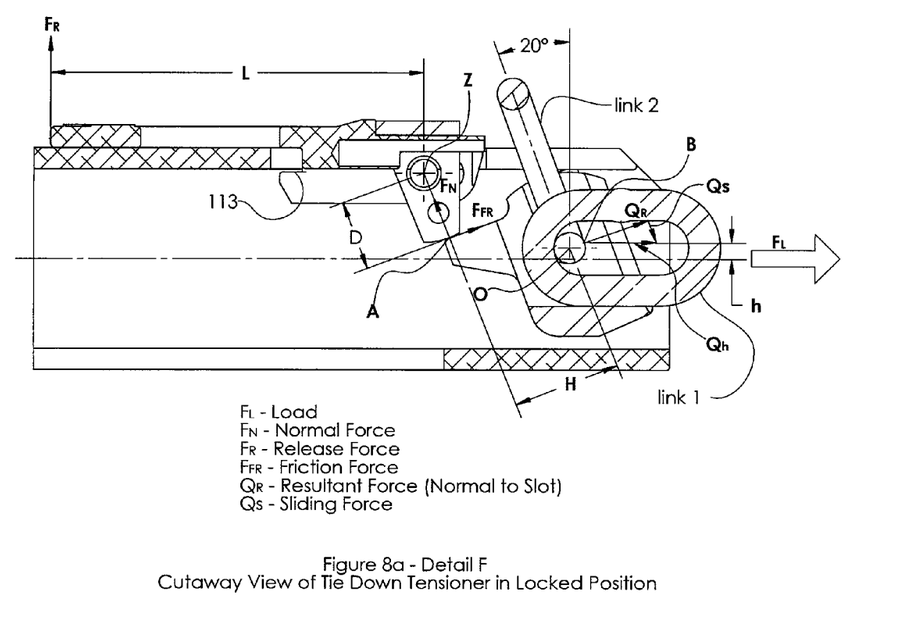
FIG. 8a is an enlarged detail taken from FIG. 8.

As best seen in FIG. 8a, release lever 71 preferably includes at least one shoulder 113 which engages body 21 when the tensioner is in the locked position. As mentioned, compression spring 74 biases release lever 71 to this engaged and locked position. Before release lever 71 can be pivoted to the unlocked position (therefore releasing the tensioned chain), release lever 71 must first be translated a predetermined distance along body 21 against the bias of compression spring 74 to move shoulder(s) 113 out of engagement with body 21. Such a design thereby provides a "safety mechanism" against inadvertent actuation of the release lever.

Referring to FIGS. 2 and 3, positive chain lock mechanism 80 includes a lock lever 81, a dowel pin 82 for pivotably attaching lock lever 81 to release lock 73, and a torsion spring 83 for maintaining contact between spring block 75 and the short shoulder of lock lever 81. Once the tensioning chain is positioned in pivot block 61 and once release lever is moved to the locked position, lock lever 81 prevents the tensioning chain from detaching from the pivot block. It is only after the release lever is actuated that the lock lever is disengaged from the tensioning chain—thereby allowing the detachment of the tensioning chain from the pivot block.

Referring to FIGS. 5 to 7a, a dynamic brake mechanism 90 includes two preconfigured surfaces, namely curved cam surface 67 of pivot block 61 and a flat surface 91 formed on body 21. After pivot block 61 is released, cam surface 67 tangentially merges with surface 91 thereby creating a frictional braking force sufficient to stop the rotation of pivot block 61 while at the same time limiting/eliminating the kickback movement of the tensioner. Of course, it is contemplated herein that the frictional braking arrangement between the pivot block and the body could be accomplished with different structure and/or utilize brake pads, or other wearable materials.

Figure 7:
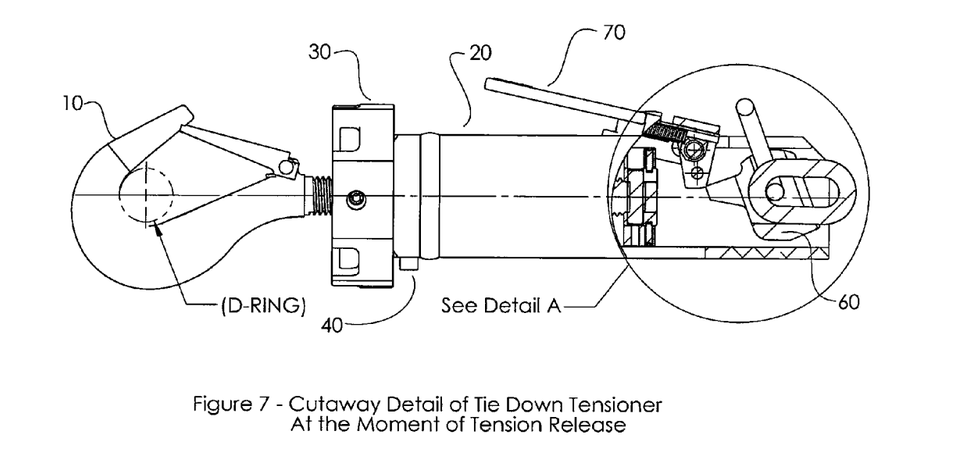
FIG. 7 is a sectional view of the present tensioner at the moment of release of the chain.
Figure 7A:
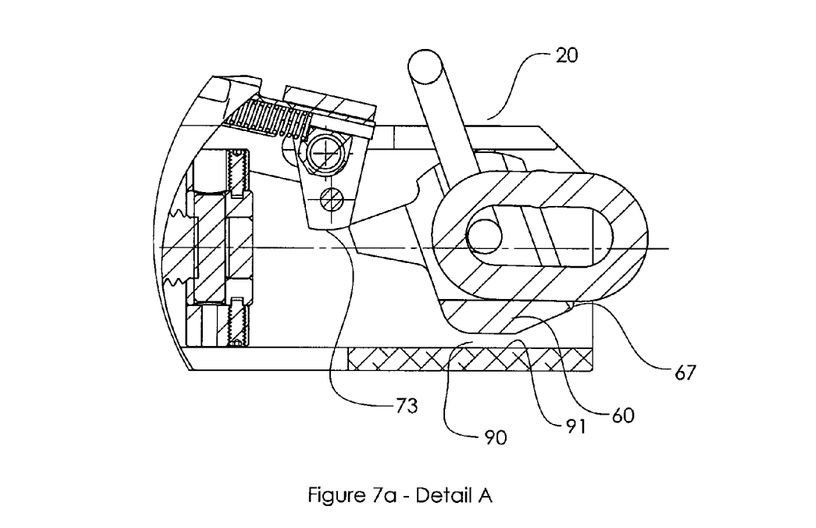
FIG. 7a is an enlarged detail taken from FIG. 7.

The preferred design of the geometry of the components of tensioner 100 is described hereinbelow with reference to FIGS. 7 to 8a. Pivot block 61 is configured to rotate around an axis O. Blind pocket 62 of pivot block 61 is oriented parallel to axis O, while slot 63 of pivot block 61 is oriented perpendicular to axis O. The bottom of blind pocket 62 defines a point of contact B between link 2 and the pivot block eccentric to axis O (distance h). A perpendicular line through the point of contact A between pivot block 61 and release lever 71 extends through the axis of rotation Z of the release lever. To release the lever, an operator applies a release force $F_R$ at a distance L from axis Z.

It has been discovered herein that the proper positioning of the chain within the blind pocket (i.e., minimizing distance h which minimizes the potential energy transferred by the tensioning chain) can be accomplished without operator intervention if the geometry of pivot block 61 is configured in a predetermined manner. In other words, the minimum distance h between the load force $F_L$ and the point of contact B is automatically accomplished without operator intervention. This will of course decrease the time and effort required to install the tensioner during a cargo securement operation. The geometry of pivot block 61 is therefore preferably configured such that the axis of symmetry of blind pocket 62 extends through axis O, and such that the tangent of the angle ("angle of friction β") between a perpendicular to $F_L$ and the axis of symmetry of blind pocket 62 is greater than the coefficient of friction between the pivot block and the chain links.

A vector of the load force $F_L$ goes through axis O. The value of the load force is a variable sum of the preliminary tension applied by the operator and any increase/decrease in tension experienced during transportation. $F_L$ is transferred through the contact of the toroid surfaces of links 1 and 2 to the pivot block at point B. Per Newton's first law, the pivot block is at rest when the resultant force (torque) of all external forces is equal to zero. Load force $F_L$ can be presented as the sum of two vectors: $Q_R$ (perpendicular to blind pocket 62) and $Q_S$ (along the direction of blind pocket 62). Ignoring the weight of link 2, $Q_h$ is substantially equal to $F_L$. In other words, $Q_h = F_L$.

$Q_R$ is the normal force which creates friction between the slot and link 2, thereby preventing link 2 from moving to the bottom of the blind pocket and reaching contact point B. $Q_R$ can be represented by the following formula:

$$Q_R = F_L \times \cos 20°.$$

$Q_{FR}$ is the friction force resisting the movement of link 2 to the bottom of the blind pocket. $Q_{FR}$ can be represented by the following formula:

$$Q_{FR} = Q_R \times K = F_L \times \cos 20° \times K,$$

where K is the coefficient of friction between the pivot block and the chain.

$Q_S$ is the driving force oriented along the direction of the blind pocket which pushes link 2 to the bottom of the blind pocket. $Q_S$ can be represented by the following formula:

$$Q_S = F_L \times \sin 20°.$$

If the driving force $Q_S$ is equal to or smaller than the friction force $Q_{FR}$, link 2 will not reach contact point B—and distance h will therefore be increased. Increasing distance h results in an increase in the kinematic energy transferred to the tensioner during the release of the tensioning chain. To ensure that link 2 reaches contact point B, it has been discovered herein that $Q_{FR}$ should be selected to be smaller than $Q_S$.

As a result, $K \leq tg\ 20°$. Thus, to ensure the proper positioning of link 2, the coefficient of friction should be less than the tangent of the angle (i.e., angle β) between the perpendicular to the tensioning chain and the blind pocket when in the closed position. In one preferred embodiment, this angle has been determined to range from 12° to 30°. In one particularly preferred embodiment, the angle has been determined to be approximately 20°.

One goal of the present invention is to minimize the value of the release force. This is particularly relevant when the tensioner is used to secure larger loads. As shown below, the distance h is directly proportional to the value of the release force $F_R$. Thus, any increase in distance h results in an increase in release force $F_R$. According to Newton's first law, the pivot block remains at rest (in the locked position) when the resultant torque around axis O is equal to zero:

$$F_N \times H - Q_h \times h = 0, \text{ where } Q_h = F_L \quad [1].$$

Ignoring friction force $F_{FR}$ for purposes of simplicity: $F_N = Q_h \times h/H$, and finally $F_N = F_L \times h/H$.

The equation similar to equation [1] for the release lever is $F_{FR} \times D - F_R \times L = 0$, where $F_{FR} = F_N \times K1$, where K1 is coefficient of friction for the contact between the release lever and the pivot block.

$$F_N \times K1 \times D = F_R \times L \text{ from which } F_R = F_N \times K1 \times D/L = F_L \times h/H \times K1 \times D/L \quad [2]$$

To reduce the value of $F_R$ in equation [2], we can consider the following options:
1) Reducing the coefficient of friction K1. This option is very limited in practice;
2) Reducing the D/L value by reducing the length of the D shoulder or by increasing the length the L shoulder. In practice, changing these values typically results in increased length/weight of the tensioner;
3) Reducing the h/H value by increasing the length of the H shoulder. In practice, changing this value typically results in increased length/weight of the tensioner; and
4) Reducing the h/H value by decreasing the length of the h shoulder. It has been discovered herein that reducing the length of the h shoulder provides the most desirable and effective method of reducing the value of the release force.

At the moment of release, the chain acts as a tensioned spring. The accumulated potential energy will immediately transform into kinetic energy—which will act to rotate pivot block 61. At the moment of release, the pivot block begins to lose contact with the release lever at point A. The equation [1] transforms, and the resultant torque is no longer zero. The pivot block will be rotated by a driving torque resulting from load force $F_L$ being applied through a distance h to the point B. This driving torque ($Q_h \times h$ or $F_L \times h$) will be almost immediately transferred to the pivot block. The pivot block (together with links 1 and 2) will start to rotate in a clockwise direction (as viewed in FIG. 8a). Links 1 and 2 will undergo an acceleration sufficient to create a centrifugal force that drives the links out of the pivot block. As a result, the tensioning chain separates from the pivot block. As discussed above, curved cam surface 67 of the pivot block provides a braking surface which smoothly transform the transferred kinetic energy into heat energy as it contacts surface 91.

It will be appreciated that the present invention has been described herein with reference to certain preferred or exemplary embodiments. The preferred or exemplary embodiments described herein may be modified, changed, added to or deviated from without departing from the intent, spirit and scope of the present invention, and it is intended that all such additions, modifications, amendments and/or deviations be included in the scope of the present invention.

What is claimed is:

1. A cargo tiedown tensioner for extending between a fixed point on a transportation vehicle and a tensioning chain, comprising:
   a) a rotatable hook subassembly for connecting said tiedown tensioner to said fixed point, said hook subassembly including a threaded shaft having first and second ends, said hook subassembly further including a hook located at said first end of said threaded shaft;

b) a support subassembly for transferring tension between said hook subassembly and said tensioning chain, said support subassembly including a rigid substantially closed body, said body including a slot extending along at least a portion of a length of the body;

c) a tensioning subassembly cooperating with said rotatable hook assembly for taking up slack in said tensioning chain;

d) an indexing mechanism for orienting said hook between predetermined positions, said indexing mechanism including a sliding block positioned inside of said body and configured to slide along at least a portion of the length thereof, said second end of said shaft being supported by said sliding block, said indexing mechanism further including a pivot lever movable between a first position wherein said threaded shaft is rotatably fixed with respect to said sliding block and a second position wherein said threaded shaft is rotatable with respect to said sliding block, at least a portion of said pivot lever being accessible via said slot to move said pivot lever between said first and second positions;

e) a chain attachment subassembly connected to and supported by said body for securing said tensioning chain to said tiedown tensioner; and f) a release subassembly connected to said body and cooperating with said chain attachment subassembly, said release subassembly including a release lever movable between a locked position wherein said tensioning chain is retained within said chain attachment subassembly and an unlocked position wherein said tensioning chain is released from said chain attachment subassembly, and wherein said indexing mechanism further includes a sleeve bearing connected to said second end of said threaded shaft, said sliding block rotatably receiving said sleeve bearing, and wherein said threaded shaft and said sliding block are secured together such that said sliding block slides inside of said body as said threaded shaft is moved inside said body while allowing rotation of said sleeve bearing with respect to said sliding block.

2. The cargo tiedown tensioner according to claim 1, wherein said sleeve bearing includes at least two opposing contact surfaces, and wherein said sliding block pivotably supports said pivot lever, said pivot lever including a first leg sized to engage one of said contact surfaces when said pivot lever is in said first position thereby rotatably fixing said threaded shaft with respect to said sliding block, said pivot lever being pivotable to said second position wherein said first leg is moved out of engagement with one of said contact surfaces thus allowing rotation of said threaded shaft with respect to said sliding block whereby said hook is rotated to a reoriented position.

3. The cargo tiedown tensioner according to claim 2, wherein said sleeve bearing includes two contact surfaces located 180 degrees apart from each other.

4. The cargo tiedown tensioner according to claim 3, wherein said pivot lever includes a second leg configured to be accessed through said slot, and wherein said pivot lever is biased to said first position.

5. The cargo tiedown tensioner according to claim 4, wherein said body is formed with a substantially rectangular cross-section.

6. The cargo tiedown tensioner according to claim 5, wherein said support subassembly further includes an end plug secured to one end of said body, said end plug including a recessed circular step, and wherein said threaded shaft includes external threads and said tensioning subassembly further includes an internal nut cooperating with said shaft and positioned within said circular step.

7. The cargo tiedown tensioner according to claim 6, further comprising a positive locking mechanism for securing said tensioning subassembly against inadvertent release and for allowing controlled operator increase and decrease of tension in said tensioning chain.

8. The cargo tiedown tensioner according to claim 7, further comprising a positive chain lock mechanism to prevent inadvertent detachment of said tensioning chain from said tiedown tensioner.

9. A cargo tiedown tensioner for extending between a fixed point on a transportation vehicle and a tensioning chain, comprising:

a) a rotatable hook subassembly for connecting said tiedown tensioner to said fixed point;

b) a support subassembly for transferring tension between said hook subassembly and said tensioning chain;

c) a tensioning subassembly cooperating with said rotatable hook assembly for taking up slack in said tensioning chain;

d) a chain attachment subassembly connected to and supported by said support subassembly for securing said tensioning chain to said tiedown tensioner, said chain attachment subassembly including a pivot block for receiving said tensioning chain;

e) a release subassembly connected to said support subassembly and cooperating with said chain attachment subassembly, said release subassembly including a release lever movable between a locked position wherein said tensioning chain is retained within said chain attachment subassembly and an unlocked position wherein said tensioning chain is released from said chain attachment subassembly; and f) a dynamic brake mechanism for dissipating the kinetic energy experienced by said tiedown tensioner at the moment of release, said dynamic brake mechanism including a pair of opposing preconfigured surfaces located on said pivot block and said support subassembly which engage upon release of said tiedown tensioner to provide a frictional braking surface, and wherein one of said pivot block and said support subassembly includes a curved cam surface, and wherein the other of said pivot block and said support subassembly includes a cooperating flat surface such that the resultant contact therebetween provides a frictional braking engagement.

10. The cargo tiedown tensioner according to claim 9, wherein said curved cam surface is located on said pivot block and said flat surface is located on said support subassembly.

11. A cargo tiedown tensioner for extending between a fixed point on a transportation vehicle and a tensioning chain, comprising:

a) a rotatable hook subassembly for connecting said tiedown tensioner to said fixed point;

b) a support subassembly for transferring tension between said hook subassembly and said tensioning chain;

c) a tensioning subassembly cooperating with said rotatable hook assembly for taking up slack in said tensioning chain;

d) a chain attachment subassembly connected to and supported by said support subassembly for securing said tensioning chain to said tiedown tensioner, said chain attachment subassembly including a pivot block for receiving said tensioning chain, said pivot block rotatable about an axis (O) extending through said support assembly, said pivot block including a blind pocket oriented parallel to said axis (O) and a sleeve oriented perpendicular to said axis (O), said blind pocket defining a contact point (B) at the bottom thereof, said contact point (B) defining the point of contact between said tensioning chain and said pivot block and further defining a distance (h) with respect to said axis (O), and wherein the axis of symmetry of said blind pocket extends through said axis (O) such that the tangent of an angle β defined between a perpendicular to a load force ($F_1$) and the axis of symmetry of said blind pocket is greater than the coefficient of friction between said pivot block and said tensioning chain whereby said tensioning chain is oriented to said contact point (B) and said distance (h) is minimized; and e) a release subassembly connected to said support assembly and cooperating with said chain attachment subassembly, said release subassembly including a release lever movable between a locked position wherein said tensioning chain is retained within said chain attachment subassembly and an unlocked position wherein said tensioning chain is released from said chain attachment subassembly, and wherein said angle β is approximately 12 degrees to 30 degrees.

12. The cargo tiedown tensioner according to claim 11, wherein said angle β is approximately 20 degrees.

13. The cargo tiedown tensioner according to claim 12, wherein said release subassembly experiences a release force $F_R = F_N \times K1 \times D/L = F_L \times h/H \times K1 \times D/L$, wherein:

$$F_N = F_L \times h/H;$$

K1 is coefficient of friction for the contact between the release lever and the pivot block;

D is distance between the axis of rotation Z of said release lever and contact point A located on said pivot block;

L is the distance between $F_R$ and axis of rotation Z of said release lever; and $F_L$ = the load force applied by the tensioning chain; and H is the distance between axis O and contact point A; and wherein said pivot block is configured to minimize said distance (h) whereby said release force ($F_R$) is reduced.

* * * * *